United States Patent
Duer

[11] 3,842,878
[45] Oct. 22, 1974

[54] THREAD LOCKING MEANS

[76] Inventor: Morris J. Duer, 4157 Mar-Moor Dr., Lansing, Mich. 48917

[22] Filed: May 10, 1973

[21] Appl. No.: 358,854

Related U.S. Application Data

[63] Continuation of Ser. No. 191,198, Oct. 21, 1971, abandoned.

[52] U.S. Cl. .............................. 151/21 C
[51] Int. Cl. .......................... F16b 39/02
[58] Field of Search ............ 151/2, 21 C, 27, 28, 15, 151/30, 19, 19 A, 2 A; 81/10, 53, 2

[56] References Cited
UNITED STATES PATENTS

| | | | |
|---|---|---|---|
| 575,109 | 1/1897 | Gulick | 151/19 R |
| 854,471 | 5/1907 | Devoe | 151/19 R |
| 1,139,671 | 5/1915 | Goodall | 151/19 R |
| 1,210,310 | 12/1916 | Hickling et al. | 151/21 C |
| 1,969,142 | 8/1934 | McIntyre | 151/19 R |
| 2,191,201 | 2/1940 | Kass | 151/19 R |
| 2,513,780 | 7/1950 | Baxter | 81/10 |
| 2,741,289 | 4/1956 | Grow | 81/10 |

Primary Examiner—Marion Parsons, Jr.
Attorney, Agent, or Firm—Malcolm R. McKinnon

[57] ABSTRACT

A one piece lock nut having a body defining an internal thread extending throughout the length thereof, the body also having an externally threaded portion and a relatively thin walled, integral, deformable locking portion at one end thereof, the locking portion being deformed by a tool mating with the external thread after the nut is in mating, threaded, seated position on a complementary threaded bolt.

3 Claims, 14 Drawing Figures

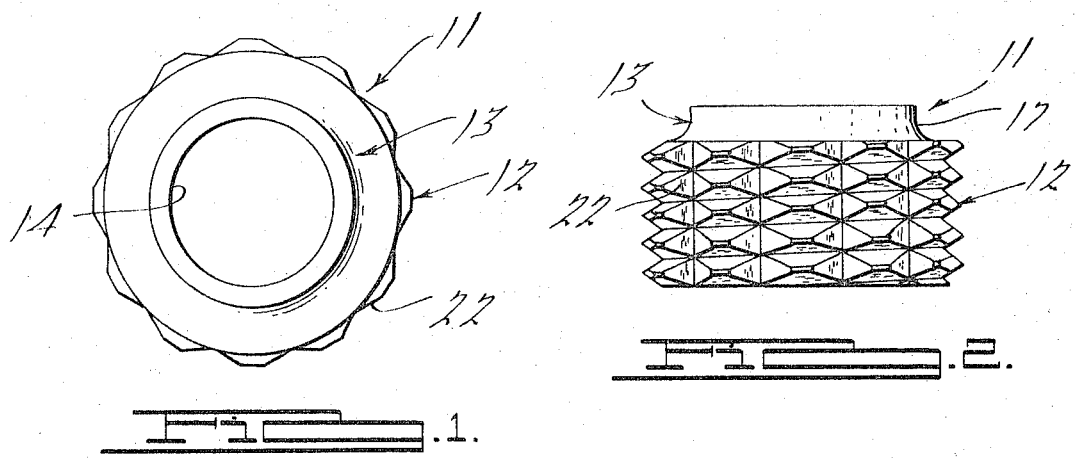
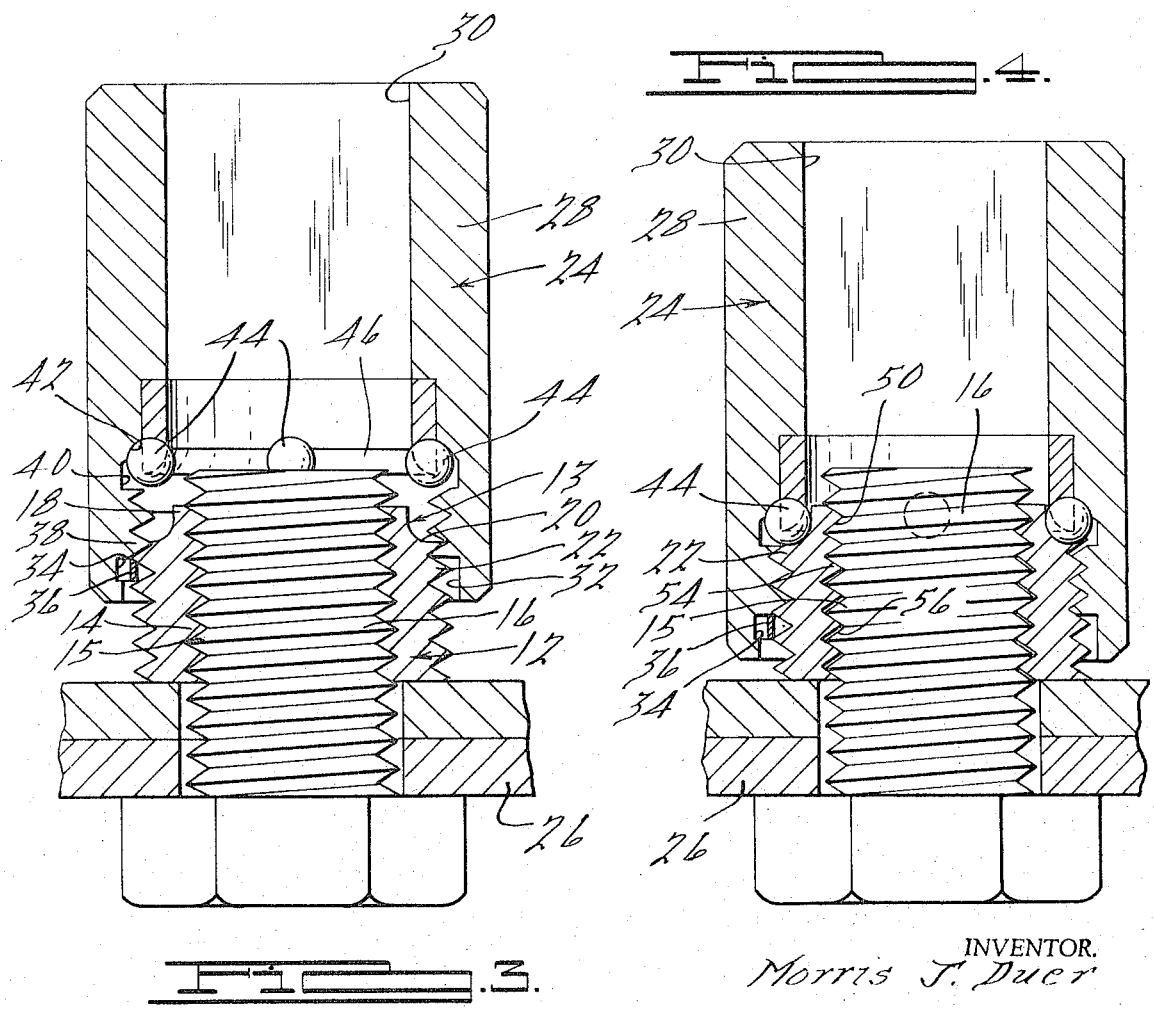

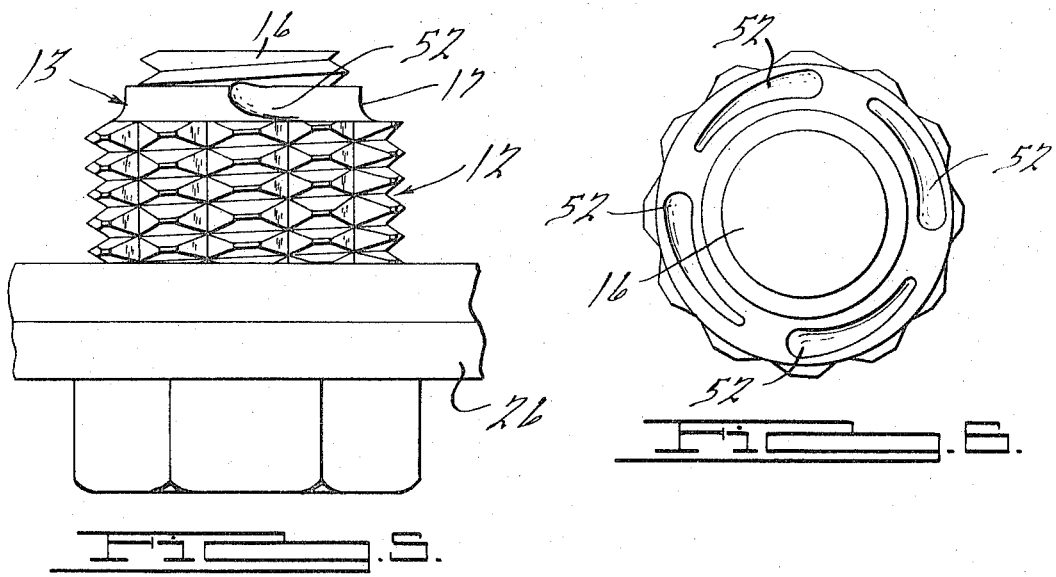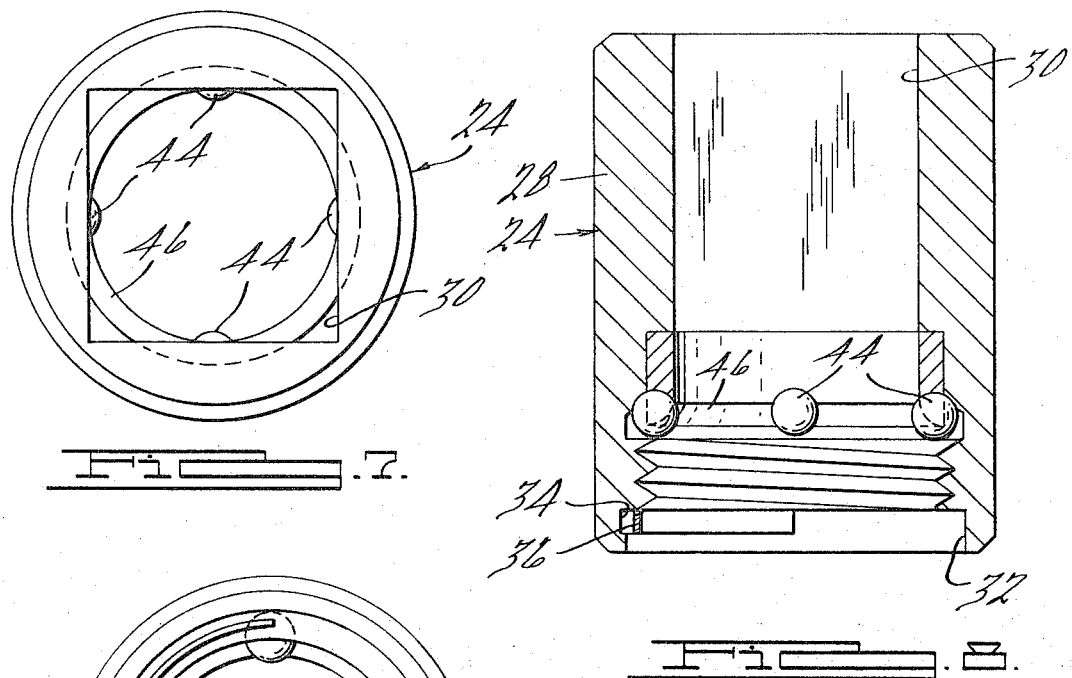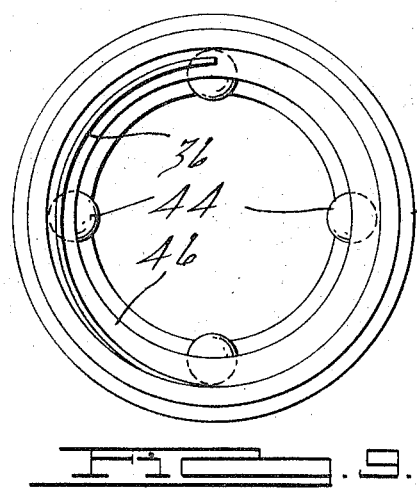

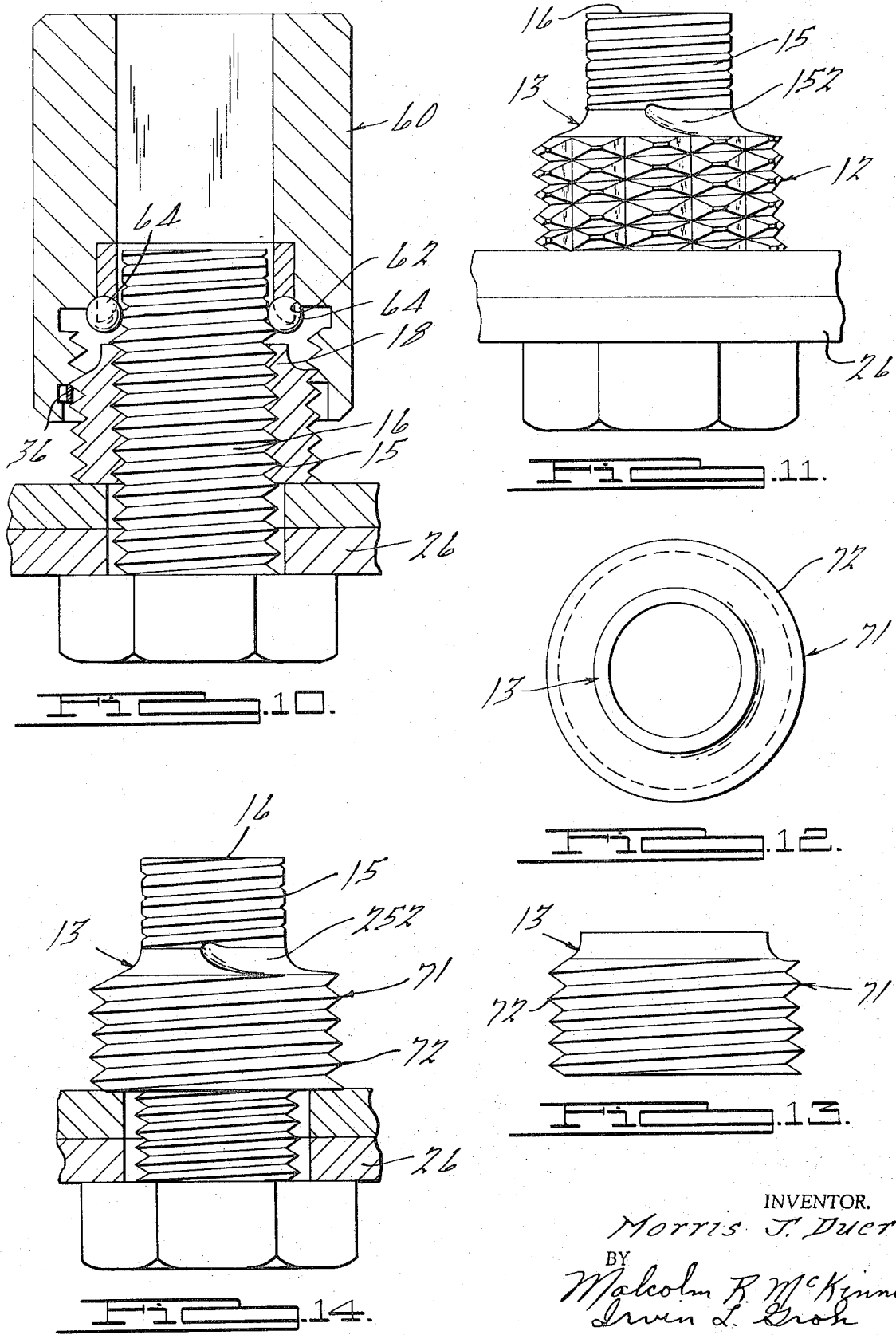

THREAD LOCKING MEANS

This is a continuation, of application Ser. No. 191,198, filed Oct. 21, 1971 now abandoned.

BRIEF SUMMARY OF THE INVENTION

This invention relates to thread locking means and, more particularly, to an improved lock nut which is free spinning on a complementary thread of a mating bolt until the nut is in a seated, assembled position against a workpiece at which time a locking portion on the nut is deformed into locking engagement with the bolt to lock the nut thereon.

Heretofore, many forms of lock nuts have been devised and are in wide commercial use for a variety of applications since they make for a more permanent assembly and reduce service attention. Many prior lock nuts are of the self-locking type, i.e., wrenching of the nut causes it to deform against the thread of the mating bolt to thereby resist disassembly. Some prior lock nuts require an excessive height in order to provide for both the locking portion and to afford a standard axial length of engagement between the internal thread of the nut and the external thread of the bolt. Also, many prior lock nuts are deformed prior to assembly on the mating bolt and are free spinning only until the end of the bolt meets the locking portion of the nut. These last mentioned lock nuts require a wrenching action with increased torque to thread the deformed locking portion on the bolt until such time as the bottom of the nut is seated against the surface of the work to be assembled. Such increased torque slows the assembly process and can be detrimental to the physical properties of the locking portion of the nut and also to the thread of the mating bolt.

Other forms of lock nuts have been provided heretofore which require elaborate tools to form the lock after the nut has been assembled on the complementary bolt and after the nut is in position relative to the workpiece. Elaborate tooling prohibits assembly of the nut in the field or in applications where the clearance requirements do not permit proper positioning of the tool.

An object of the present invention is to overcome disadvantages in prior art lock nuts and to provide an improved lock nut of the free spinning type which can be applied in the factory or in the field with relatively simple and inexpensive tooling.

Another object of the invention is to provide an improved lock nut which makes it possible to incorporate approved standard lengths of engagement between the nut and the mating bolt thread without unduly increasing the height of the nut.

Another object of the invention is to provide an improved lock nut which makes it possible to determine by visual inspection whether or not the nut has been locked in its proper position on the mating bolt.

Still another object of the invention is to provide an improved threadlocking means which is economical and commercially feasible to manufacture and assemble, durable, efficient and reliable in operation.

The above, as well as other objects and advantages of the present invention, will become apparent from the following description, the appended claims, and the accompanying drawing.

BRIEF DESCRIPTION OF THE DRAWINGS

FIG. 1 is a top plan view of a lock nut embodying the present invention;

FIG. 2 is an elevational view of the lock nut illustrated in FIG. 1;

FIG. 3 is a cross-sectional, elevational view of the lock nut illustrated in FIGS. 1 and 2, showing it in threaded engagement on a mating bolt and seated on the workpiece with the tool means for locking the nut shown in position prior to locking the nut on the mating bolt;

FIG. 4 is a cross-sectional, elevational view similar to FIG. 3 and showing the lock nut after it has been locked on the bolt and before the tool has been removed;

FIG. 5 is an elevational view of the lock nut after it has been assembled in position and locked by the tool illustrated in FIGS. 3 and 4;

FIG. 6 is an end view of the lock nut after it has been assembled and locked on the mating bolt by the tool illustrated in FIGS. 3 and 4;

FIG. 7 is a top plan view of the tool illustrated in FIG. 3;

FIG. 8 is a cross-sectional, elevational view of the tool illustrated in FIG. 3;

FIG. 9 is a bottom plan view of the tool illustrated in FIG. 8;

FIG. 10 is a cross-sectional, elevational view similar to FIG. 3 and showing the lock nut positioned on a mating bolt prior to being locked by a tool different from the tool illustrated in FIG. 3;

FIG. 11 is an elevational view of the lock nut after it has been assembled in position and locked by the tool illustrated in FIG. 10;

FIG. 12 is a top plan view of another embodiment of the invention;

FIG. 13 is an elevational view of the lock nut illustrated in FIG. 12; and

FIG. 14 is an elevational view of the lock nut illustrated in FIGS. 12 and 13 after it has been assembled and locked on a mating bolt.

DESCRIPTION OF THE PREFERRED EMBODIMENTS

Referring to the drawings and particularly to FIGS. 1 and 2, a one-piece lock nut 11 embodying the present invention is shown which includes a main body portion 12 and a thread locking portion 13 formed at the upper end of the body portion 12. The body portion 12 and lock portion 13 are provided with a continuous, uninterrupted, internal thread 14 of conventional type which is adapted to mate with a complementary male thread 15 on a conventional bolt 16 as shown for example in FIG. 3.

The lock portion 13 at the upper end of the body portion has a configuration very similar to an annular ball raceway 17 for ball bearings. As best seen in FIG. 3, the upper extremity of the lock portion 13 forms a relatively thin, annular wall 18 between the internal thread 14 and the outer surface of the lock portion 13 and the lower portion of the lock portion 13 forms a relatively wide annular base 20 merging with the body portion 12 of the lock nut 11.

As best seen in FIG. 1, in this embodiment of the invention the exterior of the main body 12 of the nut 11 is non-circular in cross-section and is provided with an external thread 22, the particular configuration shown being accomplished by forming a thread on a body portion 12 having twelve points similar to a conventional twelve point nut. The direction of the helix angle of the external thread 22 is the same as the direction of the helix angle of the internal thread, that is, with a right hand internal thread 14, the external thread is also a right hand thread but at a helix or lead angle larger than the helix or lead angle of the internal thread 14.

Referring now to FIG. 3, the tool 24 which is used to apply the lock nut 11 to the bolt 16 positioned in a work assembly 26 includes a socket body 28 very similar in form to a socket of a conventional socket wrench. The upper end of the body 28 is provided with a square opening 30 to receive the square stud of a ratchet socket wrench (not shown) or similar driving tool. The lower end of the socket body 28 has a bore 32 in which is formed a groove 34 to support a spring element 36 which engages the exterior of a nut to releasably hold the latter in position in the bore 32. Immediately above the groove 34, the bore 32 is provided with an internal thread 38 which is complementary to the thread 22 on the exterior of the nut 11.

Adjacent the upper end of the internal thread 38, the bore 32 is provided with an annular recess 40 which forms a ball raceway 42 and receives a plurality of hardened die or ball elements 44. In the specific embodiment shown four balls are uniformly spaced relative to the raceway 42 by a retainer ring 46 although it will be understood that a larger or smaller number of balls may be used.

Referring to FIG. 3, the tool 24 is illustrated in position relative to the lock nut 11 with the spring element 36 in engagement with the external thread 22. In the position shown it will be noted that the ball elements 44 of the tool 24 are disposed out of engagement with the lock portion 13 at the upper end of the nut 11. With the various elements so positioned, turning movement of the socket tool member 24 in a clockwise direction will cause the internal thread 38 to engage the upper end of the complementary thread 22 on the exterior of the main body 12 and the socket member will move axially downward relative to the lock nut until such time as the bottom of the nut 11 firmly seats on the work assembly 26 and the hardened balls 44 engage the raceway formed in the lock portion 13 at the upper portion of the lock nut 11.

Thereafter, continued rotation of the tool 24 will first tighten the nut 11 on the bolt 16 until sufficient resistance to turning of the nut is encountered and rotation of the nut stops. Continued rotation of the tool 24 relative to the stationary nut will cause the tool 24 to move axially relative to both the lock nut and the bolt 16. This causes the balls 44 to deflect the relatively thin wall section 18 into the groove 50 formed by the bolt thread 15 and at the same time each ball makes an indentation in the raceway of the lock portion 13 and deforms the upper surface of the lock nut so that when the tool is removed the nut appears as seen in FIGS. 5 and 6.

When a nut is tightened on a bolt in an assembly, the load flanks are tightly pressed together as indicated at 54 in FIG. 4 whereas the clearance flanks indicated at 56 offer a small space or clearance. However, with the nut 11 deformed as shown in FIGS. 4, 5 and 6, the lock portion 13 and particularly the thin wall portion 18 is distorted radially and uniformly inward so that the associated internal thread 14 adjacent to lock portion 13 will be wedged against the external thread 15 of the bolt 16 to completely fill the groove 50 formed by the bolt thread 15. In other words, not only the load flanks 54 but also the clearance flanks 56 are tightly engaged with each other to lock the nut 11 in position and resist its removal from the bolt 16.

It is important also to note that the nut 11 is distorted symmetrically and uniformly inwardly. Furthermore, the deformed nut 11 as seen in FIGS. 5 and 6 makes it possible to visually observe and determine that the nut not only has been positioned relative to the work assembly but also that it has been torqued or tightened to the desired amount. The indentations 52 will be readily visible even to casual inspection.

It will be noted from an examination of FIG. 3 that the balls 44 in the socket member 24 are disposed in such a manner that a clearance is provided between the major diameter of the bolt thread 15 and the internal diameter of the path of movement of the balls 44 during rotation of the socket member 24. Consequently, use of the socket member to deform the lock portion 13 of the nut 11 in no way interferes with the thread 15 of the bolt 16 and the latter remains in undeformed condition.

After the nut is applied with the tool 24 shown in FIG. 3 so that the lock portion 13 of the lock nut is deformed, it is possible to remove the lock nut 11 by using a conventional twelve point socket or box wrench. Such removal must be made against the resistance of the lock formed by the lock portion 13. However, it may be done without detrimental effect to the bolt thread 15 which may be reused with a conventional nut or with a nut embodying the invention.

Referring now to FIG. 10, another form of tool 60 is shown which is similar in most respects to the tool shown in FIGS. 3 and 4 except that for any given size of nut and bolt, the raceway 62 is of a smaller diameter than the raceway 42 of the tool 24. The inside diameter of the path described by the balls 64 is less than the major diameter of the bolt 16 and slightly larger than the minor diameter of the bolt.

When the tool 60 is used to apply a nut such as shown in FIGS. 1 and 2 to a bolt, the nut is free spinning on the thread 15 of the bolt until its lower surface engages the work assembly 26 or until the balls 64 engage the upper end of the bolt. Thereafter, rotation of the tool 60 will cause it to move axially relative to the nut 11 so that the balls 64 distort the bolt thread 15 until the balls come into engagement with the thin wall portion 18 and distort the latter axially inward to lock the nut to the bolt 16 in much the same manner as the tool in FIGS. 3 and 4. Indentations 152 will be formed in the nut as best seen in FIG. 11 and the crests of the bolt thread 15 will have been deformed. With this form of tool, deformation of the bolt thread 15 and the nut 11 makes it very difficult, if not impossible, to remove the nut.

Referring now to FIGS. 12, 13 and 14, there is shown another embodiment of the invention in the form of a lock nut 71 which in most respects is identical with the lock nut shown in FIGS. 1 and 2. However, the lock nut 71 is formed from a cylindrical blank rather than from a twelve point nut blank. The external thread 72, as best seen in FIG. 13, appears as a conventional thread without any indentations in the crest of the thread. In this form of the invention the lead or helix angle is similar to the version shown in FIGS. 1 and 2, that is, the lead or helix angle is greater than the lead or helix angle of the internal thread of the nut. The nut 71 may be applied by the tool shown in FIGS. 3 and 4 so that the lock portion 13 is distorted against the thread 15 of the bolt 16 or, in the alternative, the tool shown in FIG. 10 may be used so that both the lock portion of the nut and the bolt thread are distorted. In the applied position in a work assembly, the lock nut 71 will have the appearance shown in FIG. 14 so that the indentations 252 make it possible to visually determine that the nut has been torqued properly into position. In the form of the invention shown in FIGS. 12, 13 and 14, the cylindrical exterior of the nut will not accept any conventional form of wrench and the lock nut is particularly adapted for use in assemblies where removal is to be discouraged if, in fact, not prevented.

From the foregoing it will be seen that there has been provided, a lock nut which may be spun freely on a bolt in an assembly until the nut reaches its work surface and thereafter the lock portion of the nut is deformed to grip the complementary thread of a bolt in such a manner that removal of the nut is resisted if, in fact, prevented. Also there has been provided a lock nut in which the deformation accomplished by the simple socket wrench tool forms a particular characteristic configuration which makes it possible to visually detect that the lock nut has been tightened to the proper degree with full wrenching force.

While preferred embodiments of the invention have been shown and described it will be understood that various modifications may be made without departing from the spirit of the invention.

What is claimed is:

1. A lock nut comprising a metallic body member, an integral lock portion formed at one end of said body member, said lock portion having outside dimensions less than the corresponding outside dimensions of said body member, said body member and lock portion defining a bore provided with an internal thread extending throughout the length of said body member and said lock portion and adapted to be applied to a mating threaded member, and an externally threaded portion on said body member having an external thread extending throughout the length of said body member, said internal thread being of one helix angle and said external thread being of a larger helix angle, said external thread being adapted to receive an internally threaded tool member effective to deform said lock portion of said nut beyond the elastic limit thereof so as to reduce permanently the pitch diameter of said internal thread in said lock portion of said nut upon rotation of said tool member relative to said lock nut.

2. A lock nut according to claim 1 in which said externally threaded portion on said body member has a plurality of faces adapted to receive a wrench.

3. A lock nut according to claim 1 in which said externally threaded portion on said body is substantially circular in cross-section.

* * * * *